(12) United States Patent
Christensen et al.

(10) Patent No.: US 7,732,095 B2
(45) Date of Patent: Jun. 8, 2010

(54) ELECTRODE COMPOSITIONS BASED ON AN AMORPHOUS ALLOY HAVING A HIGH SILICON CONTENT

(75) Inventors: Leif Christensen, St. Paul, MN (US); Mark N. Obrovac, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 686 days.

(21) Appl. No.: 11/562,227

(22) Filed: Nov. 21, 2006

(65) Prior Publication Data

US 2007/0128517 A1    Jun. 7, 2007

Related U.S. Application Data

(60) Provisional application No. 60/743,002, filed on Dec. 1, 2005.

(51) Int. Cl.
    *H01M 4/58* (2006.01)
    *C22C 29/18* (2006.01)

(52) U.S. Cl. .............. 429/218.1; 429/231.95; 420/578

(58) Field of Classification Search .......... 429/200, 429/218.1, 217, 232, 231.95, 330, 331, 338; 428/578; 420/578
    See application file for complete search history.

(56) References Cited

U.S. PATENT DOCUMENTS

| | | | | |
|---|---|---|---|---|
| 2,755,178 | A * | 7/1956 | Rasmussen | 420/578 X |
| 5,900,385 | A | 5/1999 | Dahn et al. | |
| 6,001,507 | A * | 12/1999 | Ono et al. | 429/217 |
| 6,214,177 | B1 * | 4/2001 | Runkle | 420/578 X |
| 6,428,933 | B1 * | 8/2002 | Christensen et al. | 429/231.95 |
| 6,506,524 | B1 * | 1/2003 | McMillan et al. | 429/331 X |
| 6,680,145 | B2 | 1/2004 | Obrovac et al. | |
| 6,730,434 | B1 | 5/2004 | Kawakami et al. | |
| 6,824,922 | B2 | 11/2004 | Park et al. | |
| 6,964,828 | B2 | 11/2005 | Lu et al. | |
| 7,078,128 | B2 | 7/2006 | Lu et al. | |
| 7,169,328 | B2 | 1/2007 | Miller et al. | |
| 7,223,500 | B2 | 5/2007 | Noh et al. | |
| 2002/0001749 | A1 | 1/2002 | Hashimoto et al. | |
| 2003/0049535 | A1 | 3/2003 | Ohta et al. | |
| 2003/0108793 | A1 | 6/2003 | Dahn et al. | |
| 2003/0134198 | A1 | 7/2003 | Sawa et al. | |
| 2004/0121234 | A1 | 6/2004 | Le | |

(Continued)

FOREIGN PATENT DOCUMENTS

JP    08-31458    2/1996

(Continued)

OTHER PUBLICATIONS

English translation of "Detailed Description" of JP-208741 (doc date Aug. 1998).*

*Primary Examiner*—Stephen J. Kalafut
(74) *Attorney, Agent, or Firm*—Dean M. Harts; Stephen F. Wolf

(57) ABSTRACT

An electrode composition for a lithium ion battery that includes an amorphous alloy having the formula $Si_xM_yAl_z$ where x, y, and z represent atomic percent values and (a) $x+y+z=100$, (b) $x \geq 55$, (c) $y<22$, (d) $z>0$, and (e) M is one or more metals selected from the group consisting of manganese, molybdenum, niobium, tungsten, tantalum, iron, copper, titanium, vanadium, chromium, nickel, cobalt, zirconium, yttrium, and combinations thereof.

14 Claims, 2 Drawing Sheets

U.S. PATENT DOCUMENTS

2004/0179993 A1   9/2004   Dahn et al.
2005/0112054 A1   5/2005   Eberman et al.
2005/0233213 A1   10/2005  Lee et al.

FOREIGN PATENT DOCUMENTS

| JP | 10-208741 | 8/1998 |
| JP | 10-294112 | 11/1998 |
| JP | 2001-297757 | 10/2001 |
| JP | 2003-022802 | 1/2003 |
| KR | 10-2005-0081950 | 8/2005 |
| KR | 10-2005-0090220 | 9/2005 |

* cited by examiner

ELECTRODE COMPOSITIONS BASED ON AN AMORPHOUS ALLOY HAVING A HIGH SILICON CONTENT

CROSS REFERENCE TO RELATED APPLICATION

This application claims the benefit of U.S. Provisional Patent Application No. 60/743,002, filed Dec. 1, 2005, the disclosure of which is incorporated by reference herein in its entirety.

TECHNICAL FIELD

This invention relates to electrode compositions useful in lithium-ion batteries.

BACKGROUND

Melt-spun alloys containing silicon, aluminum, and various transition metal elements have been proposed for use as electrodes for lithium-ion batteries. These alloys have an amorphous microstructure that can enhance cycle life and thus overall battery performance. However, as the silicon content increases, it becomes increasingly difficult to create a composition having an amorphous microstructure. One proposed solution to this problem requires using relatively high amounts (in terms of atomic percent) and/or numbers of transition metal elements in combination with silicon and aluminum. However, this proposed solution runs the risk of rendering the materials electrochemically inactive.

SUMMARY

There is described an electrode composition for a lithium ion battery that includes an amorphous alloy having the formula $Si_xM_yAl_z$ where x, y, and z represent atomic percent values and (a) x+y+z=100, (b) x≧55, (c) y<22, (d) z>0, and (e) M is one or more metals selected from the group consisting of manganese, molybdenum, niobium, tungsten, tantalum, iron, copper, titanium, vanadium, chromium, nickel, cobalt, zirconium, yttrium, and combinations thereof. The amorphous alloy may be in the form of a single phase. An "amorphous alloy" is an alloy that lacks long range atomic order and whose x-ray diffraction pattern lacks sharp, well-defined peaks.

The value of x may be selected such that x≧60. The value of y may be selected such that y≦20.

M preferably represents no more than two metals. Specific examples of particularly useful metals include iron, titanium, zirconium, and combinations thereof.

The electrode composition may be used as the anode for a lithium-ion battery that also includes a cathode and an electrolyte. The electrolyte may include fluoroethylene carbonate. Preferably, the anode is in the form of a composite that includes the electrode composition in combination with a binder (e.g., a polyimide) and a conductive diluent (e.g., carbon black).

The electrode compositions exhibit high capacities and good cycle life while at the same time minimizing the metal M content. The ability to minimize the metal M creates electrochemically active materials that are useful as electrodes for lithium-ion batteries.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
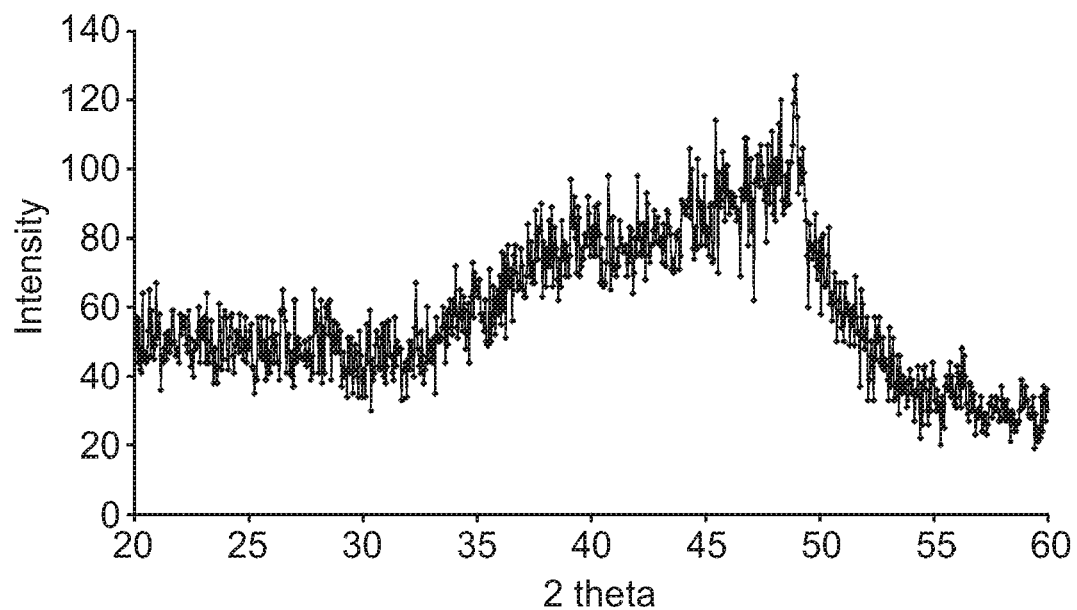
FIG. 1 is an x-ray diffraction profile for the melt-spun alloy described in Example 1.

Electrode compositions are described that are particularly useful as anodes for lithium-ion batteries. The electrode compositions feature an amorphous alloy having the formula $Si_xM_yAl_z$ where x, y, and z represent atomic percent values and (a) x+y+z=100, (b) x≧55, (c) y<22, (d) z>0, and (e) M is one or more metals selected from the group consisting of manganese, molybdenum, niobium, tungsten, tantalum, iron, copper, titanium, vanadium, chromium, nickel, cobalt, zirconium, yttrium, and combinations thereof. Particularly useful compositions are those in which x≧60, y≦20, and M represents no more than two metals.

The electrode compositions are preferably prepared by a chill block melt spinning process. Such processes are described generally, for example, in "Amorphous Metallic Alloys", F. E. Luborsky, ed., Chapter 2, Butterworth & Co., Ltd. (London), 1983. According to this process, ingots containing silicon and the metal elements are melted in a radio frequency field and then ejected through a nozzle onto the surface of a rotating metal wheel (e.g., a copper or copper alloy wheel). Because the surface temperature of the wheel is substantially lower than the temperature of the melt, contact with the surface of the wheel quenches the melt. Quenching prevents the formation of large crystallites that are detrimental to electrode performance. By using a wheel surface speed of greater than 40 m/s and an nozzle having a diameter less than 0.5 mm, amorphous compositions may be prepared.

The electrode compositions are particularly useful as anodes for lithium-ion batteries. The anode preferably is a composite in which the electrode composition is combined with a binder and a conductive diluent. Examples of suitable binders include polyimides and polyvinylidene fluoride. Examples of suitable conductive diluents include carbon blacks.

To prepare a battery, the anode is combined with an electrolyte and a cathode (the counterelectrode). The electrolyte may be in the form of a liquid, solid, or gel. Examples of solid electrolytes include polymeric electrolytes such as polyethylene oxide, fluorine-containing polymers and copolymers (e.g., polytetrafluoroethylene), and combinations thereof. Examples of liquid electrolytes include ethylene carbonate, diethyl carbonate, propylene carbonate, fluoroethylene carbonate (FEC), and combinations thereof. The electrolyte is provided with a lithium electrolyte salt. Examples of suitable salts include $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, and $LiClO_4$. Examples of suitable cathode compositions include $LiCoO_2$, $LiCo_{0.2}Ni_{0.8}O_2$, and $LiMn_2O_4$. Additional examples include the cathode compositions described in the following documents: (1) Lu et al., U.S. Publ. Pat. Appln. No. 2004/0121234; (2) Dahn et al., U.S. Publ. Pat. Appln. No. 2003/0108793; (3) Eberman et al., U.S. Publ. Pat. Appln. No. 2005/0112054; (4) Dahn et al., U.S. Publ. Pat. Appln. No. 2004/0179993; (5) Lu et al., U.S. Pat. No. 6,964,828; (6) Lu et al., U.S. Pat. No. 7,078,128; (7) Obrovac et al., U.S. Pat. No. 6,680,145; and (8) Dahn et al., U.S. Pat. No. 5,900,385.

EXAMPLES

Example 1

13.93 g of aluminum, 49.960 g of silicon, 25.637 g of iron, and 10.469 g of zirconium (all 99.8% or better purity) were weighed in a weighing dish and then placed in an ARC furnace (available from Advanced Vacuum Systems, Ayer, Mass.). The mixture was melted in an Ar atmosphere to yield an ingot having the composition $Si_{62}Al_{18}Fe_{16}Zr_4$, where all amounts are in atomic percent.

The ingot was cut into strips using a diamond blade wet saw to form 20 g strips for melt spinning. The melt spinning apparatus consisted of a vacuum chamber featuring a cylindrical quartz glass crucible. The crucible had a 16 mm internal diameter, a 140 mm length, and a 0.28 mm nozzle. The crucible was positioned above a rotating cooling wheel (Ni—Si—Cr—Cu C18000 Alloy containing 0.45 wt % Cr, 2.4 wt % Ni, 0.6 wt % Si, with the balance copper) having a thickness of 10 mm and a diameter of 203 mm. Prior to operation, the edge surface of the wheel was polished using a rubbing compound (available as IMPERIAL MICROFINISHING from 3M, St. Paul, Minn.) followed by a wipe with mineral oil to leave a thin film.

For melt spinning, a 20 g ingot strip was placed in the crucible, after which the system was evacuated to 80 mTorr and then filled with He gas to a pressure of 200 mTorr. The ingot was melted using RF induction. As the temperature reached 1275° C., a 400 mTorr He pressure was applied to the surface of the molten alloy to extrude the alloy through the nozzle and onto the spinning wheel, which rotated at 5,031 rpm (53 m/s). Ribbon strips having a width of 1 mm and a thickness of 10 microns were produced. The x-ray diffraction pattern of a representative strip was collected using a Siemens Model Kristalloflex 805 D500 diffractometer equipped with a copper target x-ray tube and a diffracted beam monochromator. The results are shown in FIG. 1. The absence of sharp peaks was evidence of an amorphous composition.

1.70 g of the melt-spun ribbon, 150 mg of Super P carbon (a conductive diluent), 0.750 g of a polyimide coating solution (PYRALIN PI2555, 20% in N-methyl pyrollidone (NMP) available from HD Microsystems, Parlink N.J.), and 3.75 g of NMP were added to a 40 ml tungsten carbide milling vessel containing a 10 mm diameter and a 10.3 mm diameter tungsten carbide ball. The vessel was placed in a planetary mill (PULVERISETTE 7, available from Fritsch GmbH, Idon-Oberstein, Germany) and milled at a setting of 8 for one hour.

Figure 2:
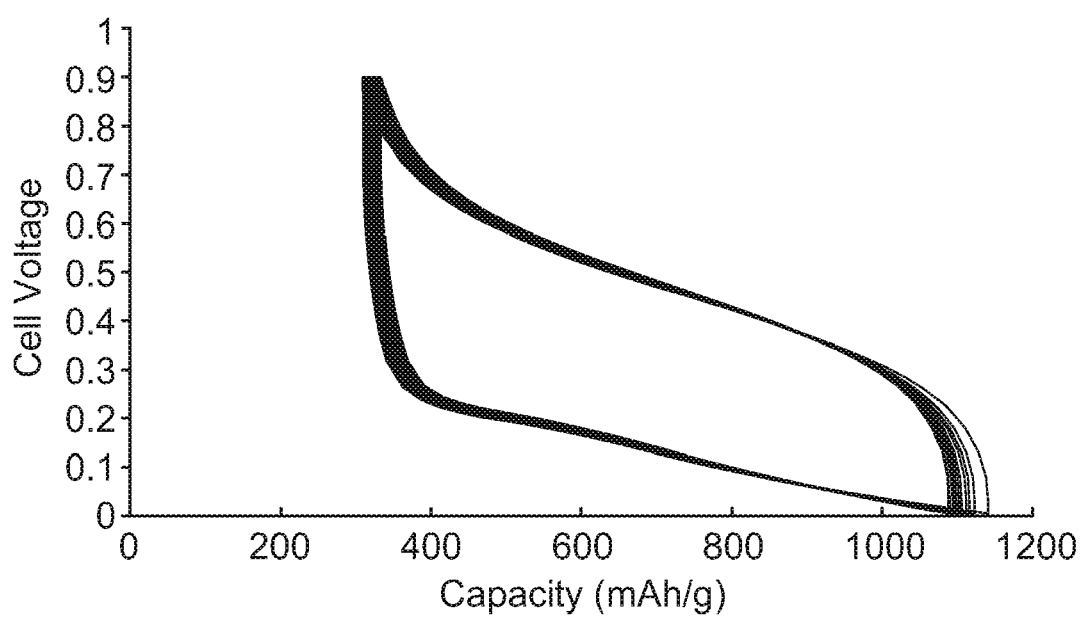
FIG. 2 illustrates the cycling performance of an electrochemical cell incorporating the melt-spun alloy described in Example 1.

Following milling, the solution was transferred to a notch coating bar and coated onto a 15 micron thick Cu foil in a 25 mm wide, 125 micron thick strip. The coating was cured at 150° C. in vacuo for 2.5 hours to form the electrode. The electrode was then used to construct a 2225 coin cell by combining it with a metallic lithium anode, two layers of a flat sheet polypropylene membrane separator (CELGARD 2400, available from Celgard Inc., Charlotte, N.C.) and 1 M $LiPF_6$ in a 1:2 mixture of ethylene carbonate and diethyl carbonate as the electrolyte. The cell was cycled using a battery cycler (MACCOR, Model 4000, available from Maccor, Tulsa, Okla.) at a constant current of 0.125 mA between 0.9V and 0.005V for the first cycle, and at a constant current of 0.5 mA between 0.9V and 0.005V for all additional cycles. The results are shown in FIG. 2. As shown in the figure, the cell exhibited good cycling performance.

Example 2

Figure 3:
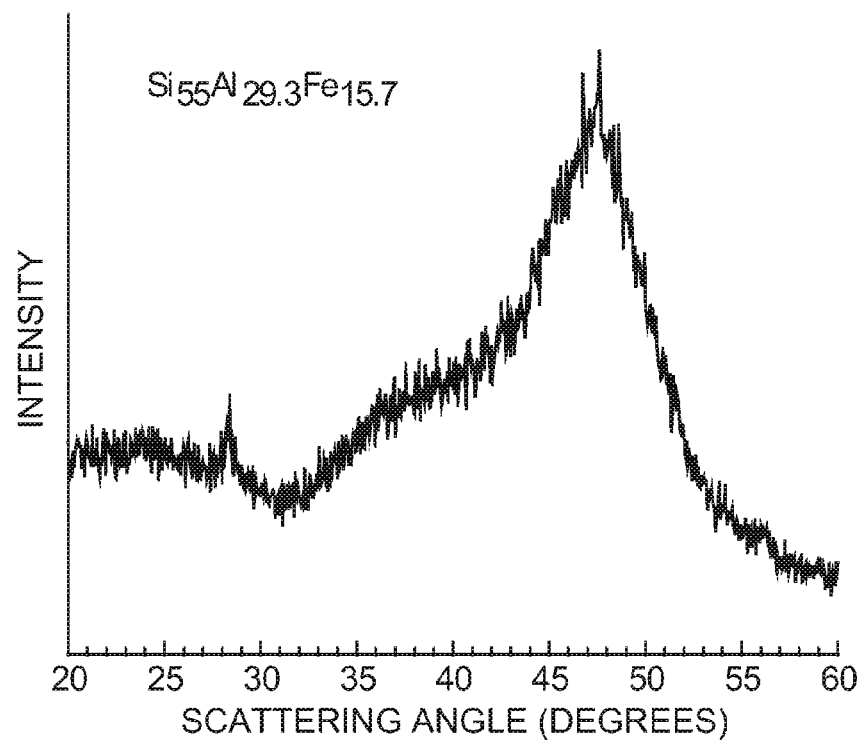
FIG. 3 is an x-ray diffraction profile for the melt-spun alloy described in Example 2.

A melt-spun ingot was prepared following the procedure described in Example 1. The composition of the alloy was $Si_{55}Al_{29.3}Fe_{15.7}$, where all amounts are in atomic percent. X-ray diffraction results, shown in FIG. 3, revealed a lack of sharp peaks, demonstrating that the composition was amorphous.

0.8 g of the melt-spun ribbon, 4.16 g of a dispersion of 3 wt. % Super P carbon (a conductive diluent), 3 wt. % polyvinylidene fluoride, 94% N-methyl pyrollidone (NMP), and 1 g of NMP were mixed together using a high-shear mixer for 15 min.

Figure 4:
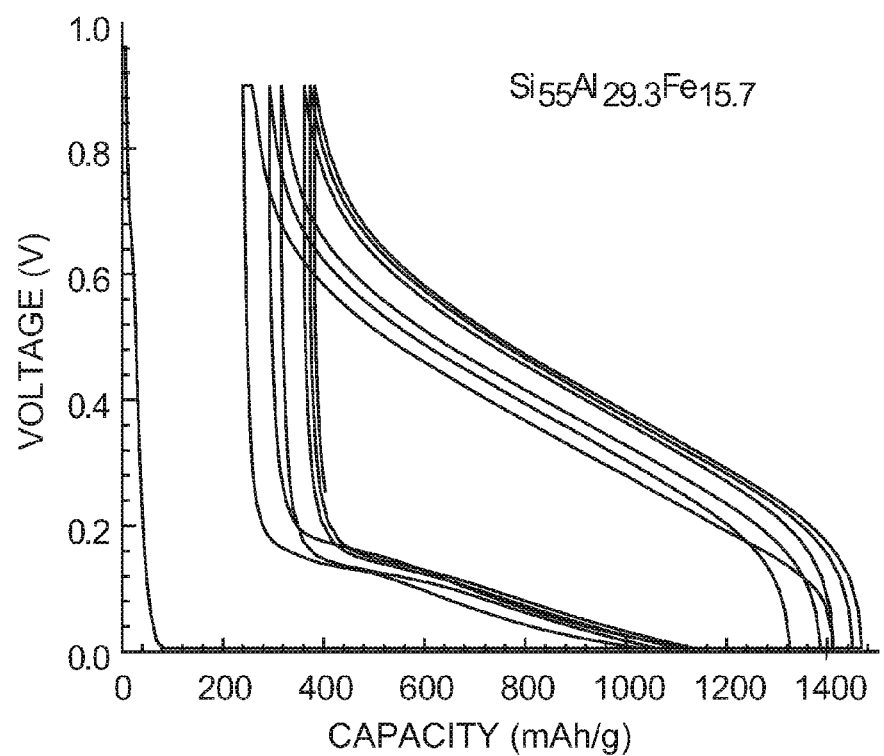
FIG. 4 illustrates the cycling performance of an electrochemical cell incorporating the melt-spun alloy described in Example 2.

Following mixing, the slurry was transferred to a notch coating bar and coated onto a 15 micron thick Cu foil in a 25 mm wide, 125 micron thick strip. The coating was cured at 150° C. in vacuo for 2.5 hours to form the electrode. The electrode was then used to construct a 2225 coin cell by combining it with a metallic lithium anode, two layers of CELGARD 2400 as the separator, and 1 M $LiPF_6$ in a 1:2 mixture of ethylene carbonate and diethyl carbonate as the electrolyte. The cell was cycled using a MACCOR cycler according to the protocol described in Table 1. The results are shown in FIG. 4. As shown in the figure, the cell exhibited good cycling performance.

TABLE 1

| Cycle | Current | Voltage | Trickle |
|---|---|---|---|
| lithiation #1 | 70 mA/g | 5 mV | 7 mA/g |
| delithiation #1 | 70 mA/g | 0.9 V | 7 mA/g |
| lithiation #2 | 70 mA/g | 5 mV | 14 mA/g |
| delithiation #2 | 70 mA/g | 0.9 V | none |
| lithiation #3+ | 140 mA/g | 5 mV | 14 mA/g |
| delithiation #3+ | 140 mA/g | 0.9 V | none |

Examples 3 and 4

Samples having the composition set forth in Table 2 were prepared according to the procedure described in Example 1. X-ray diffraction data revealed a lack of sharp peaks in both cases, demonstrating that the compositions were amorphous. The cycling capacity of electrochemical cells prepared using each composition are also set forth in Table 2. The results demonstrate that each cell exhibited good cycling behavior.

TABLE 2

| | Composition (atomic %) | | | | |
|---|---|---|---|---|---|
| Example | Si | Al | Fe | Ti | Cycling Capacity |
| 3 | 60 | 20 | 12 | 8 | 1200 mAh/g |
| 4 | 62 | 16 | 14 | 8 | 700 mAh/g |

A number of embodiments of the invention have been described. Nevertheless, it will be understood that various modifications may be made without departing from the spirit and scope of the invention. Accordingly, other embodiments are within the scope of the following claims.

What is claimed is:

1. An electrode composition for a lithium ion battery comprising an amorphous alloy having the formula $Si_xM_yAl_z$ where x, y, and z represent atomic percent values and:
   (a) x+y+z=100;
   (b) x≧55;
   (c) 15<y<22;
   (d) z>0; and
   (e) M represents no more than two metals selected from the group consisting of manganese, molybdenum, niobium, tungsten, tantalum, iron, copper, titanium, vanadium, chromium, nickel, cobalt, zirconium, yttrium, and combinations thereof, and M includes titanium, zirconium, or both.

2. An electrode composition according to claim 1 wherein x≧60.

3. An electrode composition according to claim 1 wherein y≦20.

4. An electrode composition according to claim 1 wherein x≧60 and y≦20.

5. An electrode composition according to claim 1 wherein the amorphous alloy is in the form of a single phase.

6. A lithium ion battery comprising:
   (a) an anode;
   (b) a cathode; and
   (c) an electrolyte,
wherein the anode comprises an amorphous alloy having the formula $Si_xM_yAl_z$ where x, y, and z represent atomic percent values and:
   (i) x+y+z=100;
   (ii) x≧55;
   (iii) 15<y<22;
   (iv) z>0; and
   (v) M represents no more than two metals selected from the group consisting of manganese, molybdenum, niobium, tungsten, tantalum, iron, copper, titanium, vanadium, chromium, nickel, cobalt, zirconium, yttrium, and combinations thereof, and M includes titanium, zirconium, or both.

7. A lithium ion battery according to claim 6 wherein x≧60.

8. A lithium ion battery according to claim 6 wherein y≦20.

9. A lithium ion battery according to claim 6 wherein x≧60 and y≦20.

10. A lithium ion battery according to claim 6 wherein the amorphous alloy is in the form of a single phase.

11. A lithium ion battery according to claim 6 wherein the anode further comprises a binder and a conductive diluent.

12. A lithium ion battery according to claim 11 wherein the binder comprises a polyimide.

13. A lithium ion battery according to claim 11 wherein the conductive diluent comprises carbon black.

14. A lithium ion battery according to claim 6 wherein the electrolyte comprises fluoroethylene carbonate.

* * * * *